United States Patent
Yun et al.

(10) Patent No.: US 11,181,628 B2
(45) Date of Patent: Nov. 23, 2021

(54) ACCURATE LOCALIZATION OF AN OBJECT BY A NETWORK DEVICE

(71) Applicant: Hewlett Packard Enterprise Development LP, Houston, TX (US)

(72) Inventors: Sangki Yun, Palo Alto, CA (US); Kyu-Han Kim, Palo Alto, CA (US); Raghav Hampapur Venkatnarayan, Palo Alto, CA (US); Christina Vlachou, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 328 days.

(21) Appl. No.: 16/176,326

(22) Filed: Oct. 31, 2018

(65) Prior Publication Data

US 2020/0132823 A1    Apr. 30, 2020

(51) Int. Cl.
*G01S 13/00* (2006.01)
*G01S 13/42* (2006.01)
(Continued)

(52) U.S. Cl.
CPC .......... *G01S 13/003* (2013.01); *G01S 5/0273* (2013.01); *G01S 5/10* (2013.01); *G01S 13/42* (2013.01);
(Continued)

(58) Field of Classification Search
CPC ...... G01S 13/003; G01S 13/42; G01S 5/0289; G01S 13/878; G01S 5/0252; G01S 5/06; G01S 5/02; G01S 5/0221; G01S 11/02; G01S 5/0284; G01S 5/08; G01S 5/26; G01S 5/30; G01S 5/18; G01S 5/04; G01S 5/102;
(Continued)

(56) References Cited

U.S. PATENT DOCUMENTS 7,679,561 B2 *  3/2010  Elwell, Jr. ............. G01S 19/428
                                                       342/453
9,723,586 B2     8/2017  Aggarwal et al.
(Continued)

FOREIGN PATENT DOCUMENTS

WO   WO-2015179704 A2 *  11/2015   ........ H04W 56/0095
WO   2017/099868 A1       6/2017

OTHER PUBLICATIONS

Li et al., "IndoTrack: Device-Free Indoor Human Tracking with Commodity Wi-Fi," Proceedings of the ACM on Interactive, Mobile, Wearable and Ubiquitous Technologies, vol. 1 Issue 3, 2017, pp. 72:1-72:22.

(Continued)

*Primary Examiner* — Olumide Ajibade Akonai
(74) *Attorney, Agent, or Firm* — Hewlett Packard Enterprise Patent Department

(57) ABSTRACT

Examples provide accurate localization of an object by using a network device. Examples include determining distances between transmitter and receiver antennas of a network device, transmitting, by the transmitter antenna, a wireless signal having a transmit power, receiving, by the receiver antennas, a reflected signal that reflects off of an object, receiving, by the receiver antennas, a static signal that does not reflect off of the object, and processing the static and reflected signals and determining the location of the object, based on the distances between the transmitter and the receiver antennas and the transmit power.

15 Claims, 5 Drawing Sheets

(51) Int. Cl.
*G01S 5/02* (2010.01)
*G01S 5/10* (2006.01)
*H04W 64/00* (2009.01)

(52) U.S. Cl.
CPC ......... *G01S 5/0257* (2013.01); *H04W 64/006* (2013.01)

(58) Field of Classification Search
CPC ...... G01S 13/44; G01S 13/726; G01S 13/103; G01S 7/2921; G01S 7/03; G01S 5/0257; G01S 13/46; G01S 2013/462; G01S 15/06; G01S 15/04; G01S 13/04; G01S 5/0215; G01S 19/22; G01S 19/42; G01S 19/428; G01S 5/0218; G01S 5/0242; G01S 13/582; H04B 7/0626; H04B 17/309; H04B 17/391; H04W 64/00; H04W 4/029; H04W 4/33; H04W 4/025; H04W 64/003
See application file for complete search history.

(56) References Cited

U.S. PATENT DOCUMENTS

| | | | |
|---|---|---|---|
| 2007/0120730 A1 | 5/2007 | Takano et al. | |
| 2009/0303108 A1 | 12/2009 | Hilsebecher et al. | |
| 2010/0277339 A1* | 11/2010 | Cyganski | G01S 1/026 340/8.1 |
| 2012/0029867 A1* | 2/2012 | Maher | G01S 5/0221 702/150 |
| 2012/0162012 A1* | 6/2012 | Marzouki | G01S 5/14 342/378 |
| 2013/0310074 A1* | 11/2013 | Porzio Giusto | H04W 4/023 455/456.1 |
| 2016/0174040 A1 | 6/2016 | Roberts et al. | |
| 2016/0334498 A1 | 11/2016 | Jamieson et al. | |
| 2017/0212211 A1* | 7/2017 | Gates | G01S 5/14 |
| 2017/0356979 A1* | 12/2017 | Georgiou | G01S 5/0215 |
| 2018/0217248 A1 | 8/2018 | Nakayama et al. | |

OTHER PUBLICATIONS

Qian et al., "Inferring motion direction using commodity wi-fi for interactive exergames", In Proceedings of the 2017 CHI Conference on Human Factors in Computing Systems, May 2017, pp. 1961-1972.

Qian et al., "Widar2. 0: Passive human tracking with a single wi-fi link", Proceedings of the 16th Annual International Conference on Mobile Systems, Applications, and Services, 2018, pp. 350-361.

Wang et al., "Understanding and modeling of wifi signal based human activity recognition", In Proceedings of the 21st annual international conference on mobile computing and networking, Sep. 2015, pp. 65-76.

Extended European Search Report received for EP Patent Application No. 19206278.4, dated Feb. 11, 2020, 10 pages.

Chen, Z. et al., Awl: Turning Spatial Aliasing From Foe to Friend for Accurate Wifi Localization, (Research Paper), Dec. 2017, 13 Pgs.

Gong, W. et al., SiFi: Pushing the Limit of Time-Based WiFi Localization Using a Single Commodity Access Point, (Research Paper), 2017, 21 Pgs.

Mariakakis, A. et al., SAIL: Single Access Point-based Indoor Localization, (Research Paper), Jun. 16-19, 2014, 14 Pgs.

Vasisht, D. et al., Decimeter-Level Localization with a Single WiFi Access Point, (Research Paper), Mar. 16-18, 2006, 15 Pgs.

Zaruba, G.V. et al., Indoor Location Tracking Using Rssi Readings From a Single Wi-fi Access Point, (Research Paper), Jun. 8, 2006, 15 Pgs.

* cited by examiner

ACCURATE LOCALIZATION OF AN OBJECT BY A NETWORK DEVICE

BACKGROUND

In recent years, radio frequency (RF) based localization systems have attracted a great deal of attention from industry. RF-based localization systems determine the location of an object based on a wireless signal between a transmitter and a receiver. RF-based localization systems may be useful for various applications, such as tracking the movement of objects (e.g., humans), determining certain human activities, monitoring human health conditions, and determining human emotional states.

Channel state information (CSI) refers to known channel properties of a wireless signal between a transmitter and a receiver. CSI is used to determine how a wireless signal propagates between the transmitter and the receiver and represents the combined effect, for example, of scattering, fading, and power decay of the transmitted wireless signal with distance.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
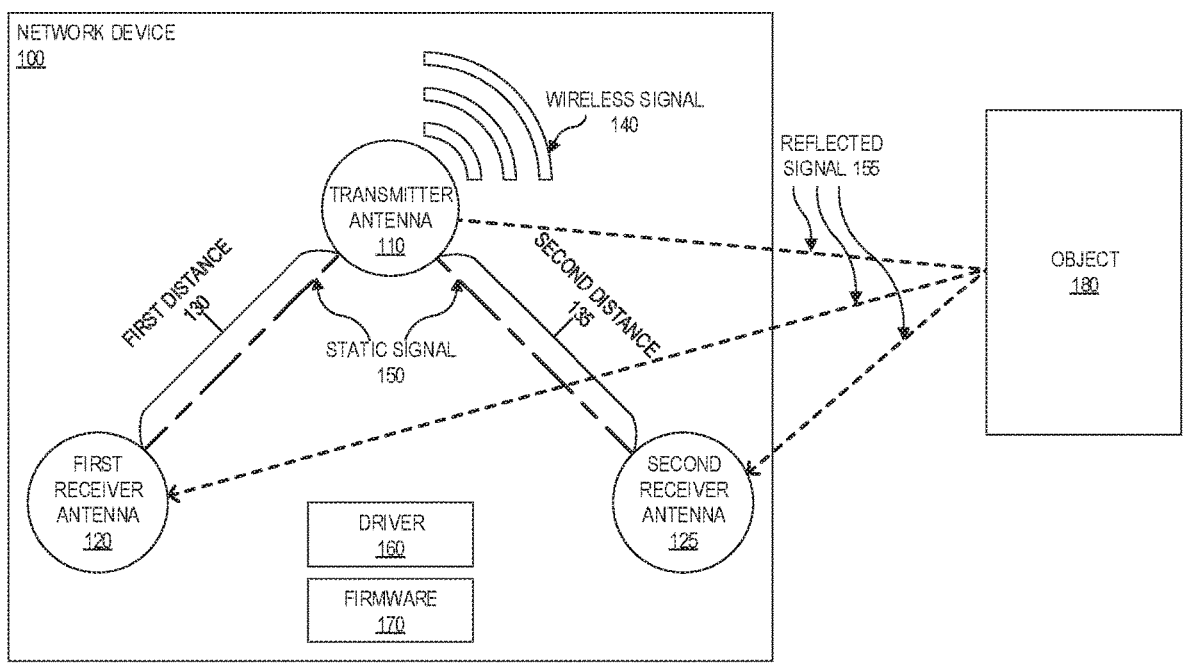
FIG. 1 is a block diagram of an example system architecture for accurate localization of an object by a network device.

Recently, there have been efforts to develop RF-based localization techniques that use CSI of wireless signals to determine the location of an object. Moreover, there have been efforts to develop RF-based localization techniques that use commodity radio hardware (e.g., off-the-shelf wireless radios) because such techniques are typically less expensive and easier to implement than those that require custom radio hardware.

Despite the great potential that RF-based localization techniques using CSI offer, prior approaches required a wireless access point (WAP) to transmit a wireless signal and a separate client device (e.g., mobile phone, laptop computer, a tablet, etc.) to receive CSI measurements from the wireless signal. This requirement is burdensome for at least the following reasons. First, the client device must be separately configured as a spectrum monitor to receive CSI measurements of the wireless signal. Second, the client device must remain in a fixed position to receive CSI measurements of the wireless signal, which prevents the client device from being used for purposes requiring mobility.

In addition, prior approaches were vulnerable to line-of-sight (LOS) interference between the WAP and the client device, which diminished their reliability and accuracy for determining a location of an object. A wireless signal experiences LOS interference when a region between the transmitter and the receiver of the wireless signal is partially or fully obstructed by another object, another signal, or a combination thereof. Since prior approaches required the transmitter and the receiver to be separate devices, LOS interference could occur in a region between the devices.

Furthermore, prior approaches could not be used in situations where the WAP and the client device were in close proximity to each other (e.g., centimeters apart). When a transmitter and a receiver are in close proximity to each other, strong self-interference occurs because a direct-path, static signal between the transmitter and the receiver is much stronger than a reflected signal that reflects off the object before being received by the receiver. Prior approaches did not account for this strong self-interference in such situations, and as a result, changes in the reflected signal became too small to analyze compared to the direct-path, static signal.

To address these issues, examples described herein provide accurate localization of an object by using a network device. In such examples, the network device may transmit, by a transmitter antenna, a wireless signal having a transmit power, and may receive, by a first receiver antenna and a second receiver antenna, a static signal and a reflected signal of the wireless signal, wherein the reflected signal is reflected off of an object and the static signal is not reflected off of the object. In such examples, the network device may process the received static and reflected signals and determine a location of the object, based on a first distance between the transmitter antenna and the first receiver antenna, a second distance between the transmitter antenna and the second receiver antenna, and the transmit power.

In this manner, examples described herein may determine the location of an object in a less burdensome and more accurate and reliable manner than prior approaches. For example, in such examples, the network device comprises both the transmitter and receiver antennas, and therefore, a separate client device does not need to be configured as a spectrum monitor to receive CSI measurements. In addition, in such examples, the network device maintains a first distance between the transmitter antenna and the first receiver antenna and a second distance between the transmitter antenna and the second receiver antenna, such that the wireless signal between the transmitter and receiver antennas is not vulnerable to LOS interference. Furthermore, such examples, the network device processes the received static and reflected signals and determines a location of the object, based on the first distance, the second distance, and the transmit power, and by doing so, accounts for strong self-interference between the transmitter and receiver antennas when they are in close proximity to each other.

FIG. 1 illustrates a network device 100 for accurate localization of an object 180, according to one example. In the example of FIG. 1, the network device 100 comprises a transmitter antenna 110, a first receiver antenna 120, and a second receiver antenna 125. A driver 160 and firmware 170 execute on the network device 100. In such examples, the driver 160 and firmware 170 may comprise instructions stored on a non-transitory machine-readable medium which are executable by a processor resource. The transmitter antenna 110 and the first receiver antenna 120 are separated by a first distance 130, and the transmitter antenna 110 and the second receiver antenna 125 are separated by a second distance 135.

In the example of FIG. 1, the transmitter antenna 110 transmits a wireless signal 140 having a transmit power. The transmit power of the wireless signal 140 is the rate of RF energy transmitted by the transmitter antenna 110 per unit time. In such examples, the driver 160 may set the transmit power of the wireless signal 140.

In the example of FIG. 1, the firmware 170 may receive, by the first receiver antenna 120 and the second receiver antenna 125, a reflected signal 155 of the wireless signal 140 that is reflected off of the object 180. In such examples, the firmware 170 may receive, by the first receiver antenna 120 and the second receiver antenna 125, a static signal 150 of the wireless signal 140 that is not reflected off of the object 180. In such examples, the static signal 150 and the reflected signal 155 may comprise CSI measurements of the wireless signal 140.

In the example of FIG. 1, the driver 160 may process the static signal 150 and the reflected signal 155 and determine a location of the object 180, based on the first distance 130, the second distance 135, and the transmit power of the wireless signal 140.

In some examples, the driver 160 may generate a mathematical model to approximate a static signal and a reflected signal to be received by the first and second receiver antennas 120 and 125, based on the first distance 130, the second distance 135, and the transmit power. In such examples, the driver 160 may generate a mathematical model to approximate CSI of the static signal and the reflected signal to be received by the first and second antennas 120 and 125, based on the first distance 130, the second distance, and the transmit power. In such examples, the driver 160 may process the received static signal 150 and the reflected signal 155 based on the approximated static and reflected signals of the model.

CSI may be modeled mathematically as a sum of two signals: a static signal which is not reflected off an object, and a reflected signal which is reflected off the object. The static signal comprises a direct-path signal between a transmitter and a receiver, whereas the reflected signal comprises a reflected signal which reflects off the object before being received by the receiver, A model of CSI is shown in Equation (1), as follows:

$$H(m) = a_{s,m} e^{-j2\pi \frac{d_{s,m}}{\lambda}} + a_{r,m} e^{-j2\pi \frac{d_{r,m}}{\lambda}}, \quad (1)$$

where $a_{s,m}$ and $a_{r,m}$ are the magnitudes of the static and reflected signals, and $d_{s,m}$ and $d_{r,m}$ are the signal travel distances of the static and reflected signals.

However, actual CSI measurements include phase noise due to an unknown amount of phase rotation $e^{-j\Delta}$ in the transmitted wireless signal. This phase rotation $e^{-j\Delta}$ may be caused by various factors, including, but not limited to, channel frequency offset, sampling timing offset, packet detection delay, or a combination thereof. This phase rotation $e^{-j\Delta}$ is unpredictable and can vary with every data transmission frame of the wireless signal. A model of CSI between a transmitter and a receiver which accounts for this phase rotation $e^{-j\Delta}$ is shown in Equation (2), as follows:

$$H(m) = e^{-j\Delta} \left( \sum_{k=1}^{N} a_k^m e^{-j\frac{2\pi f_c d_k^m}{c}} \right), \quad (2)$$

where N is the number of reflection paths between the transmitter antenna and the receiver antenna m, $f_c$ is the wireless channel frequency, c is the speed of light, and $a_k^m$ and $d_k^m$ are amplitude and signal travel distance of the received signal at receiver antenna in from the k-th signal traversal path. When an RF-based localization system does not account for this phase rotation $e^{-j\Delta}$, a phase change of CSI measurements cannot be used to accurately track the movement of an object.

A CSI sanitation technique is now further explained. Let H(m, n) be a complex conjugate of the CSI from two receiver antennas m and n. A model of H(m, n) is shown in Equation (3), as follows:

$$H(m, n) = H(m) \times H(n)^* = e^{-j\Delta} \left( \sum_{k=1}^{N_m} a_k^m e^{-j\frac{2\pi f_c d_k^m}{c}} \right) \quad (3)$$

$$e^{j\Delta} \left( \sum_{k=1}^{N_n} a_k^n e^{j\frac{2\pi f_c d_k^n}{c}} \right) = \left( \sum_{k=1}^{N_m} a_k^m e^{-j\frac{2\pi f_c d_k^m}{c}} \right) \left( \sum_{k=1}^{N_n} a_k^n e^{j\frac{2\pi f_c d_k^n}{c}} \right).$$

As shown in Equation (3), since $e^{-j\Delta} \times e^{j\Delta} = 1$, the impact of phase noise can be cancelled out by taking the complex conjugate of the CSI of a wireless signal received by two receiver antennas in and n, even though the exact value of the phase rotation $e^{-j\Delta}$ is unknown.

Accordingly, a model of the conjugate of two CSIs H(m, n) may be derived according to Equation (4), as follows:

$$H(m, n) = a_{s,m} a_{s,n} e^{-j2\pi \frac{d_{s,m}}{\lambda}} e^{j2\pi \frac{d_{s,n}}{\lambda}} + a_{s,m} a_{r,n} e^{-j2\pi \frac{d_{s,m}}{\lambda}} e^{j2\pi \frac{d_{r,n}}{\lambda}} + \quad (4)$$

$$a_{r,m} a_{s,n} e^{-j2\pi \frac{d_{r,m}}{\lambda}} e^{j2\pi \frac{d_{s,n}}{\lambda}} + a_{r,m} a_{r,n} e^{-j2\pi \frac{d_{r,m}}{\lambda}} e^{j2\pi \frac{d_{r,n}}{\lambda}}.$$

In some examples, the driver 160 may use a simplified model of H(m, n) by exploiting the known antenna geometry of the network device 100. First, when the transmitter antenna 110 and the receiver antennas 120 and 125 are in close proximity of each other (e.g., centimeters apart), $a_{s,m}$ and $a_{s,n}$ can be approximated to be much greater than $a_{r,m}$ and $a_{r,n}$. Likewise, the product $a_{r,m} a_{r,n}$ can be approximated to be much smaller than the products of $a_{s,m} a_{s,n}$, $a_{s,m} a_{r,n}$, and $a_{r,m} a_{s,n}$. Thus, the fourth term of Equation (4) can be removed with only a small approximation error, Furthermore, based on a symmetry of the receiver antennas 120 and 125 with respect to the transmitter antenna 110 in the network device, the magnitudes $a_{r,m}$ and $a_{r,n}$ of the reflected signal at the receiver antennas m and n can be approximated to be the same, and so both magnitudes can be denoted as $a_r$. Also, for any given distance d, $$e^{j2\pi \frac{d}{\lambda}} = e^{j2\pi \frac{k\lambda}{\lambda}} e^{j2\pi \frac{r}{\lambda}} = e^{j2\pi \frac{r}{\lambda}},$$

where k and r are the quotient and remainder when d is divided by $\lambda$.

Accordingly, in such examples, the driver 160 may use a simplified model of H(m, n) according to Equation (5), as follows:

$$H(m, n) = \quad (5)$$

-continued $$a_{s,m}a_{s,n}e^{-j2\pi\frac{d_{s,m}}{\lambda}}e^{j2\pi\frac{d_{s,n}}{\lambda}} + a_{s,m}a_re^{-j2\pi\frac{d_{s,m}}{\lambda}}e^{j\varphi_n} + a_ra_{s,n}e^{-j\varphi_m}e^{j2\pi\frac{d_{s,n}}{\lambda}},$$

where $\varphi_k = \text{mod}(2\pi d_{r,k}, \lambda)$, and $d_{r,k}$ is a reflected signal travel distance for a receiver antenna k.

For such examples, the number of CSI conjugates H(m, n) modeled by the driver 160 depends on the total number of receiver antennas which receive the wireless signal from the transmitter antenna 110. For example, when the network device 100 has two receiver antennas m and n (i.e., first and second receiver antennas 120 and 125) which each receive the wireless signal 140 from the transmitter antenna 100, there is one CSI conjugate H(m, n) pair from the two receiver antennas m and n. On the other hand, when the network device 100 has four receiver antennas which each receive the wireless signal 140 from the transmitter antenna 100, there are a total of six CSI conjugate pairs H(m, n) from each pair of the receiver antennas m and n, where $1 \leq m, n \leq 4$ and in $m \neq n$.

In some examples, the driver 160 may further exploit the known antenna geometry of the network device 100 in two ways. First, the driver 160 may use the known antenna geometry to approximate the magnitudes of the static signal to be received by two receiver antennas in and n according to a free-space path loss (FSPL) model. The driver 160 may determine the approximated magnitudes of the static signal according to the models shown in Equations (6) and (7), as follows:

$$a_{s,m} = P_tG_tG_r\left(\frac{\lambda}{4\pi d_{s,m}}\right)^2, \quad (6)$$

$$a_{s,n} = P_tG_tG_r\left(\frac{\lambda}{4\pi d_{s,n}}\right)^2, \quad (7)$$

where $a_{s,m}$ is an approximated magnitude of the static signal to be received by the receiver antenna m, $d_{s,m}$ is the first distance, $a_{s,n}$ is an approximated magnitude of the static signal to be received by the second receiver antenna n, $d_{s,n}$ is the second distance, $P_t$ is the transmit power, $G_t$ is an antenna gain of the transmitter antenna 110, and $G_r$ is an antenna gain of each of the two receiver antennas m and n.

In contrast, some prior approaches could only model H(m, n) using the third term of Equation (4). This is because some prior approaches manipulated the magnitude of CSI measurements received at one receiver antenna in to be a value significantly smaller than the magnitude of CSI measurements received at another receiver antenna n. Thus, in examples described herein, the driver 160 models H(m, n) more accurately than prior approaches.

In such examples, the driver 160 may model H(m, n) under optimal conditions, since the transmitter antenna 110 and the receiver antennas m and n are in close proximity with each other (e.g. centimeters apart), and a direct LOS is maintained between the transmitter antenna 110 and the receiver antennas m and n. As a result, the driver 160 models H(m, n) more accurately and reliably than prior approaches.

Furthermore, in such examples, the driver 160 may model H(m, n) based on fixed distances between the transmitter antenna 110 and the receiver antennas 120 and 125. This is unlike prior approaches, which required repeated estimations of the distance between the transmitter and the receiver upon any change in location of the client device. Thus, the driver 160 models CSI more accurately and reliably than prior approaches.

In such examples, after the driver 160 determines the approximated magnitudes of $a_{s,m}$ and $a_{s,n}$, the remaining unknowns in the model of Equation (6) are $a_r$, $\varphi_m$, and $\varphi_n$, each of which relate to the location of the object.

In some examples, the driver 160 may precompute values of $a_r$ and $\varphi_k$ for each receiver antenna. In such examples, the driver 160 may determine, for each distance D of a predetermined set of distances, the approximated reflected signal magnitude $a_r$. In such examples, the driver 160 may model the value of $a_r$ according to an FPSL model shown in Equation (8), as follows:

$$a_r = P_tG_tG_r\left(\frac{\lambda}{8\pi D}\right)^2, \quad (8)$$

where each distance D of the predetermined set of distances is measured from an origin fixed at the center of a plane relative to the receiver antennas. For example, when the network device 100 has two receiver antennas 120 and 125, the origin is located at a midpoint between the two receiver antennas 120 and 125 along a plane including the two receiver antennas 120 and 125. On the other hand, when the network device 100 has four receiver antennas which are arranged at the corners of a square, the origin is located at the center of the square along a plane including the four receiver antennas.

In some examples, the driver 160 may determine, for each polar coordinate <D, θ> of a predetermined set of polar coordinates, a set of values of $\varphi_k$ for each receiver antenna k. It is noted that according to Equation (6), $\varphi_k = \text{mod}(2\pi d_{r,k}, \lambda)$. The driver 160 may approximate the reflected signal travel distance $d_{r,k}$ as the sum of the distance from the transmitter antenna to the polar coordinate <D, θ> and the distance from the polar coordinate <D, θ> to the receiver antenna k. Put another way, the driver 160 approximates $d_{r,k}$ as the sum of the distances between the two pairs of points (<$D_t$, $\theta_t$>, <D, θ>) and (<D, θ>, <$D_k$, $\theta_k$>), where <$D_k$, $\theta_k$> is the polar coordinates of a receiver antenna k relative to the origin, and <$D_t$, $\theta_t$> is the polar coordinates of the transmitter antenna relative to the origin. Thus, in such examples, the driver 160 may model $\varphi_k$ according to Equation (9), as follows:

$$\varphi_k = \text{mod}\left(2\pi \times \left(\sqrt{\frac{D_t^2 + D^2 -}{2D_tD\cos(\theta_t - \theta)}} + \sqrt{\frac{D_k^2 + D^2 -}{2D_kD\cos(\theta - \theta_k)}}\right), \lambda\right). \quad (9)$$

In some examples, the driver 160 may determine the polar coordinates <$D_t$, $\theta_t$> and <$D_k$, $\theta_k$> based on the fixed locations of the transmitter antenna and of each receiver antenna k. In such examples, the driver 160 may determine, for each polar coordinate <D, θ> of the predetermined set of polar coordinates, a set of $\varphi_k$ values for all of the receiver antennas, denoted as φ. That is, for each polar coordinate <D, θ> of the predetermined set of polar coordinates, the driver 160 may determine $\varphi \in \{\varphi_1, \ldots, \varphi_z\}$, where z is the total number of receiver antennas which receive the wireless signal.

In some examples, the driver 160 may store the key pair values of <D, $a_r$, θ, m, n> and H(m, n) into a repository. For example, the stored key pair values of <D, $a_r$, θ, m, n> and H(m, n) may be used process the static signal 150 and the reflected signal 155 of the wireless signal 140. In such examples, the repository may be a database on at least one machine-readable storage medium.

In some examples, the at least one machine-readable storage medium may be any electronic, magnetic, optical, or other physical storage device that contains or stores executable instructions. Thus, the at least one machine-readable storage medium may comprise, for example, various RAM, ROM, flash memory, or a combination thereof. For example, the at least one machine-readable storage medium may include a NVRAM, an EEPROM, a storage drive, a NAND flash memory, and the like.

In some examples, after the driver 160 receives measured CSI conjugates CSI(m, n) for all possible pairs of antennas (m, n), the driver 160 may then determine the polar coordinate <D, θ> of the predetermined set of polar coordinates whose tuple <$a_r$, φ> most closely matches the model of H(m, n) according to Equation (5). In such examples, the driver 160 may determine the maximum likelihood (ML) estimation of <$a_r$, φ> by solving an optimization problem according to Equation (10), as follows:

$$\underset{a_r,\varphi}{\arg\min} \sum_{m,n}^{m,n<z,m\neq n} \|CSI(m, n) - H(m, n)\|^2, \quad (10)$$

where CSI(m, n) is the conjugate of the two CSI measurements from two receiver antennas in and n, and z is the total number of receiver antennas which receive the transmitted wireless signal.

The inventors have also discovered that consecutive estimations of <D, θ> may vary over a short time period (e.g., 1 second) due to additional noise in the CSI measurements. Thus, in some examples, the driver 160 may generate a histogram of estimations during intervals within a predetermined time period (e.g., 1 second). In such examples, the driver 160 may group the estimations of <D, θ> within the predetermined time period into "bins," i.e., consecutive, non-overlapping intervals of values, and then select the histogram bin with the highest number of measurements as the best estimate of <D, θ> for that predetermined time period. In such examples, the driver 160 may determine best ML estimates for D and θ are according to Equations (11) and (12), as follows:

$$D = \arg\max_{D} Hist(D), \quad (11)$$

$$\theta = \arg\max_{\theta} Hist(\theta). \quad (12)$$

In some examples, based on the best ML estimates of for D and θ, the driver 160 may determine the location of the object in 2D Cartesian coordinates according to Equation (13), as follows:

$$<x, y> = <D \cos\theta, D \sin\theta>. \quad (13)$$

In some examples, the driver 160 may the location of multiple objects by leveraging Doppler shifts in CSI measurements. Doppler shift is an apparent change in the frequency of a wireless signal due to relative motion between a transmitter and a receiver. If an object moves such that the length of the reflected signal distance from the object changes at a speed v, then the Doppler Shift DFS is given by DFS=v/λ, where λ is the wavelength of the transmitted wireless signal. Thus, when R objects move simultaneously near the network device 100, the frequency shifts from each of the individuals add up individually and pair-wise, which creates a sum of $$R + \binom{R}{2}$$

sinusoidal waves in the measured CSI conjugates CSI(m, n) of the received static and reflected signals.

In some examples, the driver 160 may apply a short-time Fourier transform (STFT) on the measured CSI conjugates CSI(m, n) over a small time period (e.g., 1 second) and then discard the frequencies with a power lower than an predetermined threshold power (e.g., 60 dBm). Let F be the number of frequencies which are above the predetermined threshold power. In such examples, the driver 160 may determine a value of an integer R such that the value of $$R + \binom{R}{2}$$

is closest to F. In such examples, the driver 160 may determine that this value of R is the total number of objects to be tracked.

In some examples, the driver 160 may apply independent component analysis (ICA) to separate the waveforms in the measured CSI conjugates CSI(m, n) into R individual waveforms corresponding to each of the R objects. In such examples, for each individual waveform, the driver 160 may determine the location coordinates of each corresponding object in the same manner as described above. Thus, in such examples, the driver 160 may determine the location of multiple objects by determining R location coordinates for each of the R objects.

In some examples, each of the first distance 130 and the second distance 135 may be greater than the lower bound of the Fresnel zone for the transmitter antenna 110. That is, each of the first distance 130 and the second distance 135 may be greater than $$\frac{L^2}{2\lambda},$$

where L is the length of the transmitter antenna 110 and λ is the wavelength of the wireless signal 140.

Although FIG. 1 illustrates the network device 100 having two receiver antennas 120 and 125, in some examples, the network device may have more than two receiver antennas. In such examples, the network device 100 may have a four receiver antennas which receive static and reflected signals of a wireless signal transmitted by transmitter antenna 110. In such examples, the four receiver antennas may be arranged at the corners of a square.

Although FIG. 1 illustrates the network device 100 having one transmitter antenna 110, in some examples, the network device 100 may have more than one transmitter antenna. In such examples, each of the transmitter antennas may transmit the wireless signal simultaneously. In such examples, the network device 100 may have four transmitter antennas which are symmetrically arranged relative to four receiver antennas, wherein each of the four transmitter antennas transmits the wireless signal. In such examples, the four transmitter antennas may be arranged at corners of a square.

In some examples, the wireless signal 140 may be a Wi-Fi signal. As used herein, the term "Wi-Fi" is meant to encompass any type of wireless communications that conforms to the Institute of Electrical and Electronic Engineers (IEEE) 802.11 standard, whether 802.11ac, 802.11ax, etc. The term "Wi-Fi" is currently promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of WAP with any other brand of client hardware that also is certified. Typically, however, any Wi-Fi product using the same radio frequency (e.g., 5 GHz for 802.11ac) will work with any other, even if such products are not "Wi-Fi Certified." The term "Wi-Fi" is further intended to encompass future versions and/or variations on the foregoing communication standards. Each of the foregoing standards is hereby incorporated by reference.

In such examples, the network device 100 may transmit and receive Wi-Fi signals that conform to the IEEE 802.11ac standard at a frequency range of 5 GHz. In some examples, the network device 100 may transmit and receive Wi-Fi signals that conform to the IEEE 802.11ax standard at a frequency range of 5 GHz. However, persons of skill in the art will understand that the network device may transmit and receive wireless signals that conform to other wireless communications standards and/or operate at different frequency ranges.

In such examples, the network device 100 may be, for example, a WAP. In such examples, network device 100 may engage in any network data transmission operations, including, but not limited to, switching, routing, bridging, or a combination thereof. A WAP generally refers to receiving points for any known or convenient wireless access technology which may later become known. Specifically, the term WAP is not intended to be limited to IEEE 802.11-based WAPs. A WAP generally functions as an electronic device that is adapted to allow wireless devices to connect to a wired network via various communications standards. A WAP may include any necessary hardware components (not shown) to perform the inventions disclosed herein, including, but not limited to: processors, memories, display devices, input devices, communications equipment, etc.

In some examples, the first distance 130 may be equal to the second distance 135. In some examples, when the network device 110 has more than two receiver antennas which receive the wireless signal, the distances between the transmitter antenna 110 and each of the receiver antennas may be equal to each other.

In some examples, the first receiver antenna 120 and the second receiver antenna 125 may be symmetrically arranged with respect to the transmitter antenna 110. In some examples, when the network device has more than two receiver antennas which receive the wireless signal, each of the receiver antennas may be symmetrically arranged with respect the transmitter antenna 110. In some examples, when the network device has more than one transmitter antenna, the transmitter antennas may be symmetrically arranged with respect to the receiver antennas.

Figure 2A:
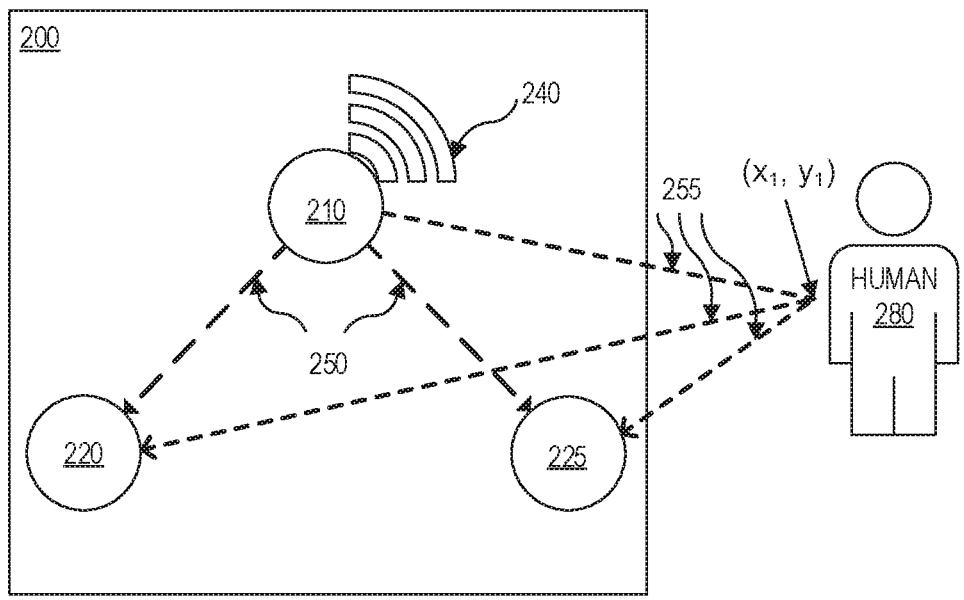
FIG. 2A and FIG. 2B show examples of accurate localization of an object by a network device.
Figure 2B:
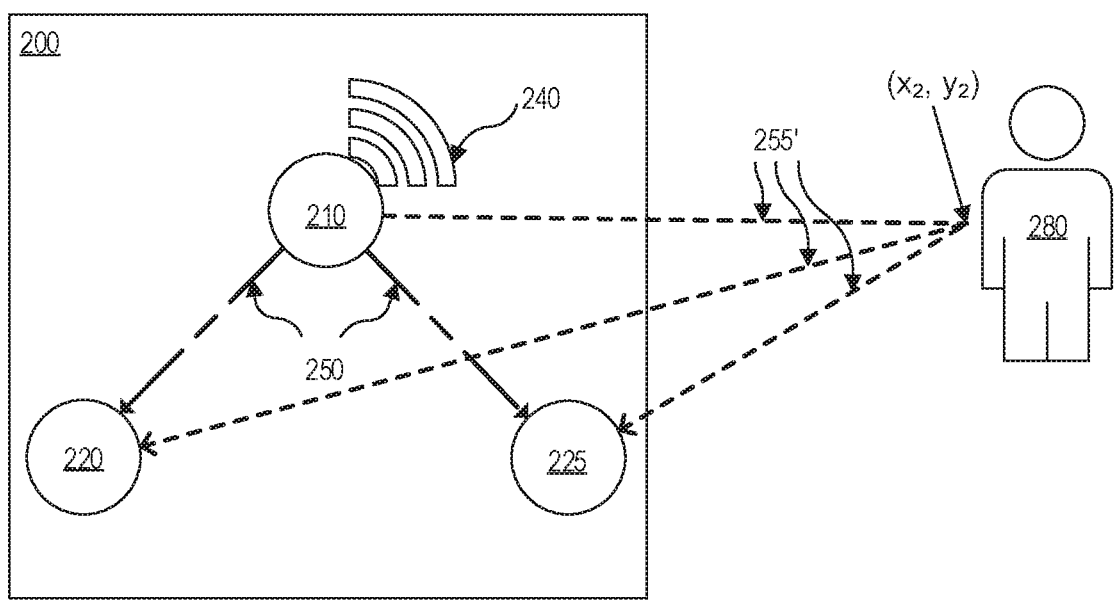

FIGS. 2A and 2B illustrate a network device 200 for accurate localization of an object 280, according to one example. As shown, the network device 200 includes a transmitter antenna 210, a first receiver antenna 220, and a second receiver antenna 225. For the ease of understanding, many aspects of network device 200 are omitted in FIG. 2A and FIG. 2B, but network device 200 may include any element described in connection with network device 100, above. Moreover, as shown in FIGS. 2A and 2B, the object 280 is a human. However, the object 280 may be any living or non-living object.

As shown in FIG. 2A, the network device 200 may receive, by the first receiver antenna 220 and the second receiver antenna 225, a static signal 250 and a reflected signal 255 of a wireless signal 240, wherein the reflected signal 255 is reflected off of a human 280 and the static signal 250 is not reflected off of the human 280. The static signal 250 and the reflected signal 255 may comprise CSI measurements of the transmitted wireless signal 240. Moreover, as shown in FIG. 2A, the human 280 is located at a first location $(x_1, y_1)$.

As shown in FIG. 2B, when the human 280 moves to a second location $(x_2, y_2)$, the static signal 250 may remain the same, but the reflected signal 255' may change based on the movement of the human 280. The static signal 250 and the reflected signal 255' may comprise CSI measurements of the transmitted wireless signal 240. In such examples, the network device 200 may determine a change to the reflected signal 255' based on the movement of the human 280 and determine the second location $(x_2, y_2)$ of the human 280.

Figure 3:
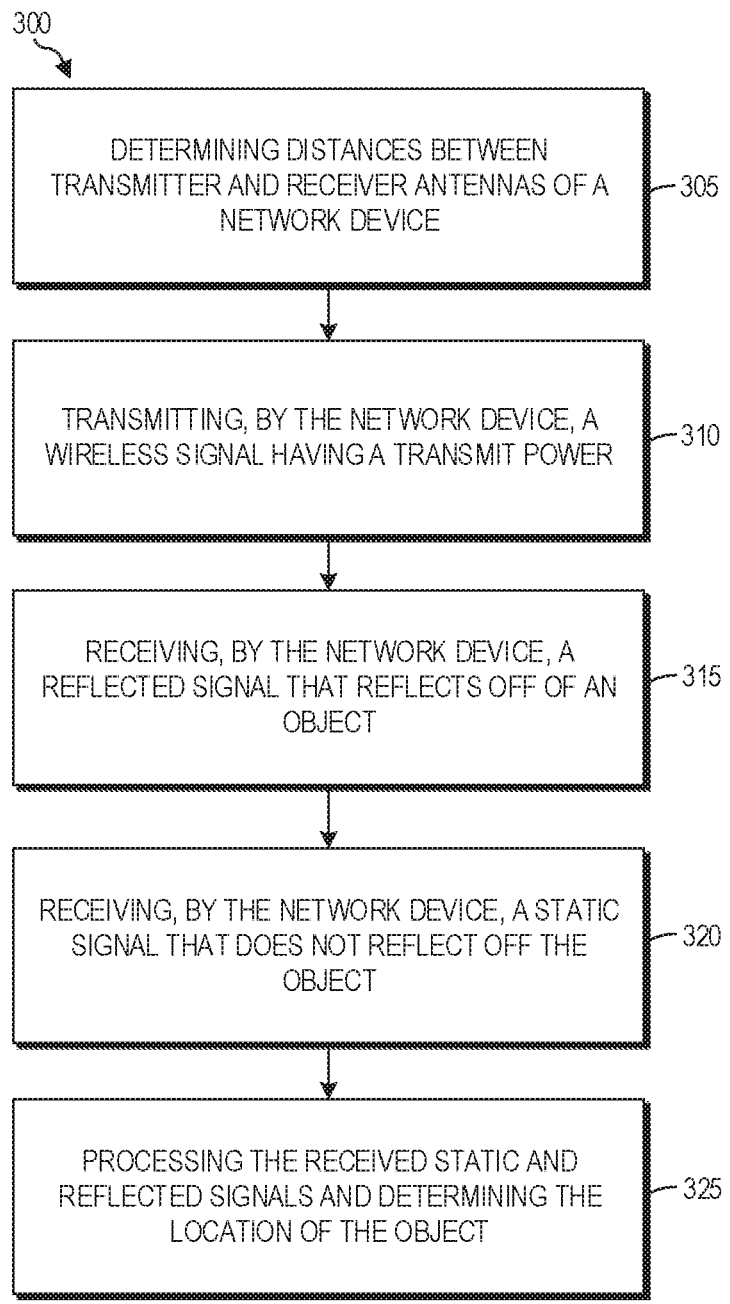
FIG. 3 is a flowchart of an example process of accurate localization of an object by a network device.

FIG. 3 illustrates functionality 300 for a network device as described herein, according to one example. The functionality 300 may be implemented as a method or may be executed as instructions on a machine (e.g., by one or more processors), where the instructions are included on at least one computer-readable storage medium (e.g., a transitory or non-transitory computer readable-storage medium). While only five blocks are shown in the functionality 300, the functionality 300 may include other actions described herein. Also, some of the blocks shown in the functionality 300 may be omitted without departing from the spirit and scope of this disclosure. The functionality 300 may be implemented on a network device according to any of the examples herein.

As shown in block 305, the functionality 300 may include determining distances between transmitter and the receiver antennas of a network device.

In some examples, determining distances between transmitter and receiver antennas of a network device may comprise: determining a first distance between a transmitter antenna of the network device and a first receiver antenna of the network device; and determining a second distance between the transmitter antenna and a second receiver antenna of the network device.

In some examples, determining distances between transmitter and receiver antennas of a network device may comprise: computing a first distance between a transmitter antenna and the first receiver antenna; and computing a second distance between the transmitter antenna and the second receiver antenna, based on known location coordinates of the transmitter antenna and the second receiver antenna.

In some examples, determining distances between transmitter and receiver antennas of a network device may comprise: computing antenna locations in polar coordinates of each of the receiver antennas, based on known location coordinates of the transmitter antenna and the receiver antennas. In such examples, the origin of the polar coordinates of each receiver antenna may be fixed at the center of a plane relative to the receiver antennas. In such examples, the magnitude of the distance of each receiver antenna from the origin may be computed as $\sqrt{x_k^2+y_k^2}$, and the angle of each receiver antenna from the origin may be computed as $$\tan^{-1}\left(\frac{y_k}{x_k}\right),$$

where $x_k$ and $y_k$ are the known location coordinates of receiver antenna k.

As shown in block 310, the functionality 300 may include transmitting, by the network device, a wireless signal having a transmit power.

In some examples, transmitting, by the network device, a wireless signal having a transmit power may comprise: transmitting, by a transmitter antenna, a wireless signal having the transmit power. In some examples, transmitting by the network device, a wireless signal having a transmit power may comprise: setting, by a driver of the network device, the transmit power of the wireless signal.

In some examples, transmitting, by the network device, a wireless signal having a transmit power may comprise: transmitting the wireless signal from multiple transmitter antennas simultaneously. In such examples, the wireless signal transmitted by each of the transmitter antennas may have the same transmit power.

In some examples, transmitting, by the network device, a wireless signal having a transmit power may comprise: transmitting, by a wireless radio, a wireless signal having the transmit power. In such examples, the wireless radio may be an off-the-shelf Wi-Fi radio. In such examples, the Wi-Fi radio may conform to the IEEE 802.11ac standard, and may transmit and receive wireless signals at a frequency range of 5 GHz, In such examples, the Wi-Fi radio may conform to the IEEE 802.11ax standard, and may transmit and receive wireless signals at a frequency range of 5 GHz. However, persons of skill in the art will understand that the Wi-Fi radio may transmit wireless signals that conform to other wireless communications standards and/or operate at different frequency ranges. In such examples, the Wi-Fi radio may comprise one or more transmitter antennas for transmitting the wireless signal having the transmit power.

As shown in block 315, the functionality 300 may include receiving, by the network device, a reflected signal that reflects off of an object. In such examples, the reflected signal comprises CSI measurements of the wireless signal. In such examples, receiving CSI measurements of the reflected signal may be performed by firmware of the network device.

In some examples, receiving, by the network device, a reflected signal that reflects off of an object may comprise: receiving, by a first receiver antenna and a second receiver antenna, the reflected signal of the wireless signal, In some examples, receiving, by the network device, a reflected signal that reflects off of an object may comprise: receiving, by more than two receiver antennas, the reflected signal of the wireless signal.

In some examples, receiving, by the network device, a reflected signal that reflects off of an object may comprise: receiving, by a wireless radio, the reflected signal of the wireless signal. In such examples, the wireless radio may be an off-the-shelf Wi-Fi radio. In such examples, the Wi-Fi radio may conform to the IEEE 802.11ac standard, and may transmit and receive wireless signals in the 5 GHz frequency range. In such examples, the Wi-Fi radio may conform to the IEEE 802.11 ax standard, and may transmit and receive wireless signals in the 5 GHz frequency range. However, persons of skill in the art will understand that Wi-Fi radio may receive wireless signals that conform to other wireless communications standards and/or operate at different frequency ranges. In such examples, the Wi-Fi radio may comprise two or more receiver antennas for receiving the reflected signal of the wireless signal.

In some examples, receiving, by the network device, a reflected signal that reflects off of an object may comprise: receiving, by a first receiver antenna and a second receiver antenna, a reflected signal of the wireless signal. In such examples, the reflected signal is reflected off of the object to be tracked. Moreover, in such examples, the reflected signal comprises CSI measurements of the wireless signal.

As shown in block 320, the functionality 300 may include receiving, by the network device, a static signal that does not reflect off of the object. In such examples, the static signal comprises CSI measurements of the wireless signal, In such examples, receiving CSI measurements of the reflected signal may be performed by firmware of the network device.

In some examples, receiving, by the network device, a static signal that does not reflect off of the object may comprise: receiving, by a first receiver antenna and a second receiver antenna, the static signal of the wireless signal. In such examples, the static signal comprises a static, direct-path signal between the transmitter antenna and the receiver antennas.

In some examples, receiving, by the network device, a static signal that does not reflect off of an object may comprise: receiving, by a wireless radio, the static signal of the wireless signal. In such examples, the wireless radio may be an off-the-shelf Wi-Fi radio. In such examples, the Wi-Fi radio may conform to the IEEE 802.11ac standard, and may transmit and receive wireless signals in the 5 GHz frequency range. In such examples, the Wi-Fi radio may conform to the IEEE 802.11ax standard, and may transmit and receive wireless signals in the 5 GHz frequency range, However, persons of skill in the art will understand that Wi-Fi radio may receive wireless signals that conform to other wireless communications standards and/or operate at different frequency ranges. In such examples, the Wi-Fi radio may comprise two or more receiver antennas for receiving the reflected signal of the wireless signal.

In some examples, receiving, by the network device, the static and the reflected signals may comprise: simultaneously receiving the static and reflected signals by one or more receiver antennas and/or one or more wireless radios.

As shown in block 325, the functionality 300 may include processing the received static and reflected signals and determining a location of the object. In such examples, processing the received static and reflected signals and determining a location of the object may be performed by a driver of the network device, In some examples, processing the received static and reflected signals may comprise: processing the received static and reflected signals based on the first distance, the second distance, and the transmit power. In such examples, processing the received static and reflected signals and determining a location of the object may include determining, for each of a plurality of intervals within a predetermined time period, a ML estimation of a magnitude of the received reflected signal. In such examples, the ML estimation may be determined according to Equations (9) and/or (10) above. In such examples, processing the received static and reflected signals may include determining, for the plurality of intervals, a best ML estimation of a distance of the object from the network device. In such examples, the best ML estimation of the distance may be determined according to Equation (11) above. In such examples, processing the received static and reflected signals may include determining, for the plurality of the intervals, a best ML estimation of an angle of the object from the network device. In such examples, the best ML estimation of the angle may be determined according to Equation (12) above.

In some examples, determining the location of the object may comprise determining the location of the object in 2D Cartesian coordinates, according to Equation (13) above.

In some examples, functionality 300 may include determining locations of multiple objects based on the processed static and reflected signals. In such examples, determining the locations of the multiple objects may leverage Doppler shifts, as explained above. In addition, determining the locations of the multiple objects may apply STFT on the received static and reflected signals over a small time period, as explained above. Furthermore, determining the locations of the multiple objects may apply ICA to separate the waveforms in the received static and reflected signals into individual waveforms corresponding to the number of objects, as explained above.

Figure 4:
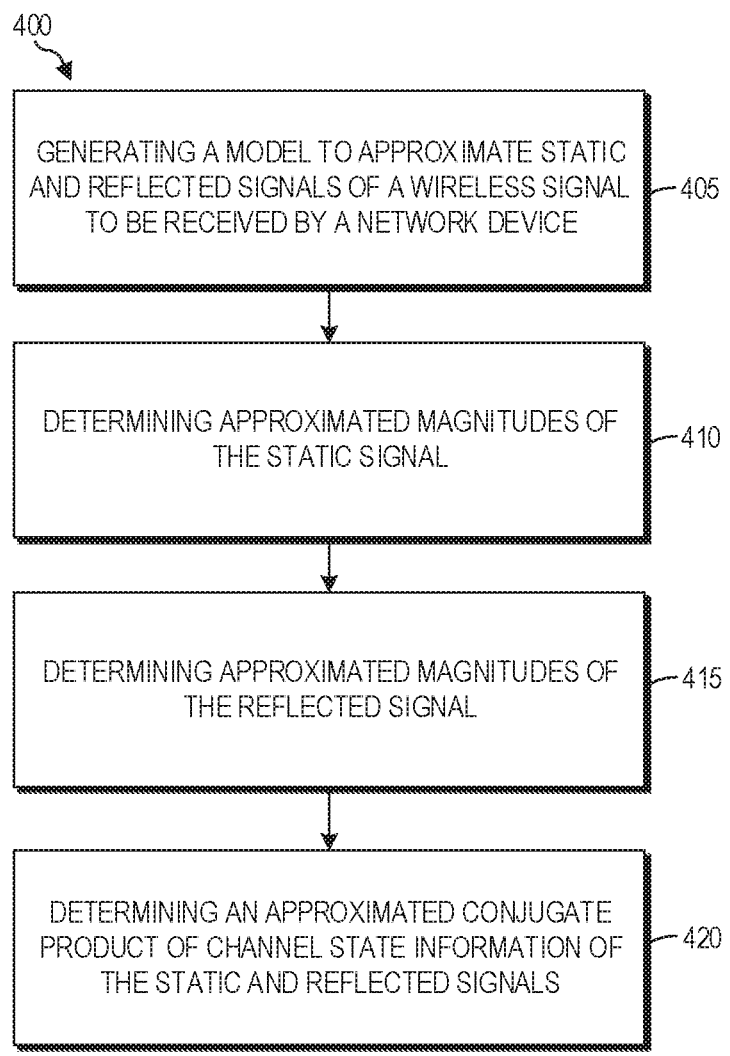
FIG. 4 is a flowchart of an example process of accurate localization of an object by a network device.

FIG. 4 illustrates functionality 400 for a network device as described herein, according to one example. The functionality 400 may be implemented as a method or may be executed as instructions on a machine (e.g., by one or more processors), where the instructions are included on at least one computer-readable storage medium (e.g., a transitory or non-transitory computer readable-storage medium). While only four blocks are shown in the functionality 400, the functionality 400 may include other actions described herein. Also, some of the blocks shown in the functionality 400 may be omitted without departing from the spirit and scope of this disclosure. The functionality 400 may be implemented on a network device according to any of the examples herein.

As shown in block 405, the functionality 400 may include generating a model to approximate static and reflected signal of a wireless signal to be received by a network device.

In some examples, generating the model to approximate static and reflected signals of a wireless signal to be received by a network device may be performed by a driver of the network device. In some examples, generating the model to approximate static and reflected signal of a wireless signal to be received by a network device may be performed by another device than the network device.

In some examples, generating the model to approximate static and reflected signals of a wireless signal to be received by a network device may comprise: generating a model to approximate a static signal and a reflected signal to be received by the first and second receiver antennas, based on the first distance, the second distance, and a transmit power of a wireless signal to be transmitted by the transmitter antenna.

As shown in block 410, the functionality 400 may include determining approximated magnitudes of the static signal.

In some examples, determining approximated magnitudes of the static signal may comprise: determining approximated magnitudes of the static signal to be received by the first and second receiver antennas. In such examples, determining the approximated magnitudes of the static signal may be based on the first distance, the second distance, and the transmit power. Moreover, in such examples, determining the approximated magnitudes of the static signal may be based on an antenna gain of the first receiver antenna and an antenna gain of the second receiver antenna. In such examples, the antenna gains of the first and second receiver antennas may be determined from a datasheet of the network device. In such examples, determining the approximated magnitudes of the static signal may be according to Equations (6) and/or (7) above.

As shown in block 415, the functionality 400 may include determining approximated magnitudes of the reflected signal.

In some examples, determining approximated magnitudes of the reflected signal may comprise: determining, for each of a predetermined set of distances, an approximated magnitude of a reflected signal to be received by each of the first and second receiver antennas, based on the transmit power. In such examples, determining the approximated magnitudes of the reflected signal may be according to an FPSL model. In such examples, determining the approximated magnitudes of the reflected signal may be according to Equation (8) above.

As shown in block 420, the functionality 400 may include determining an approximated conjugate product of CSI of the static and reflected signal.

In some examples, determining an approximated conjugate product of CSI of the static and reflected signal may comprise: determining an approximated conjugate product of CSI of the static and reflected signals to be received by the first receiver antenna and by the second receiver antenna. In such examples, determining an approximated conjugate product of CSI of the static and reflected signals may comprise using a simplified model of the conjugate product of CSI, In such examples, determining the approximated conjugate product of CSI of the static and reflected signals may be according to Equation (5) above.

Figure 5:
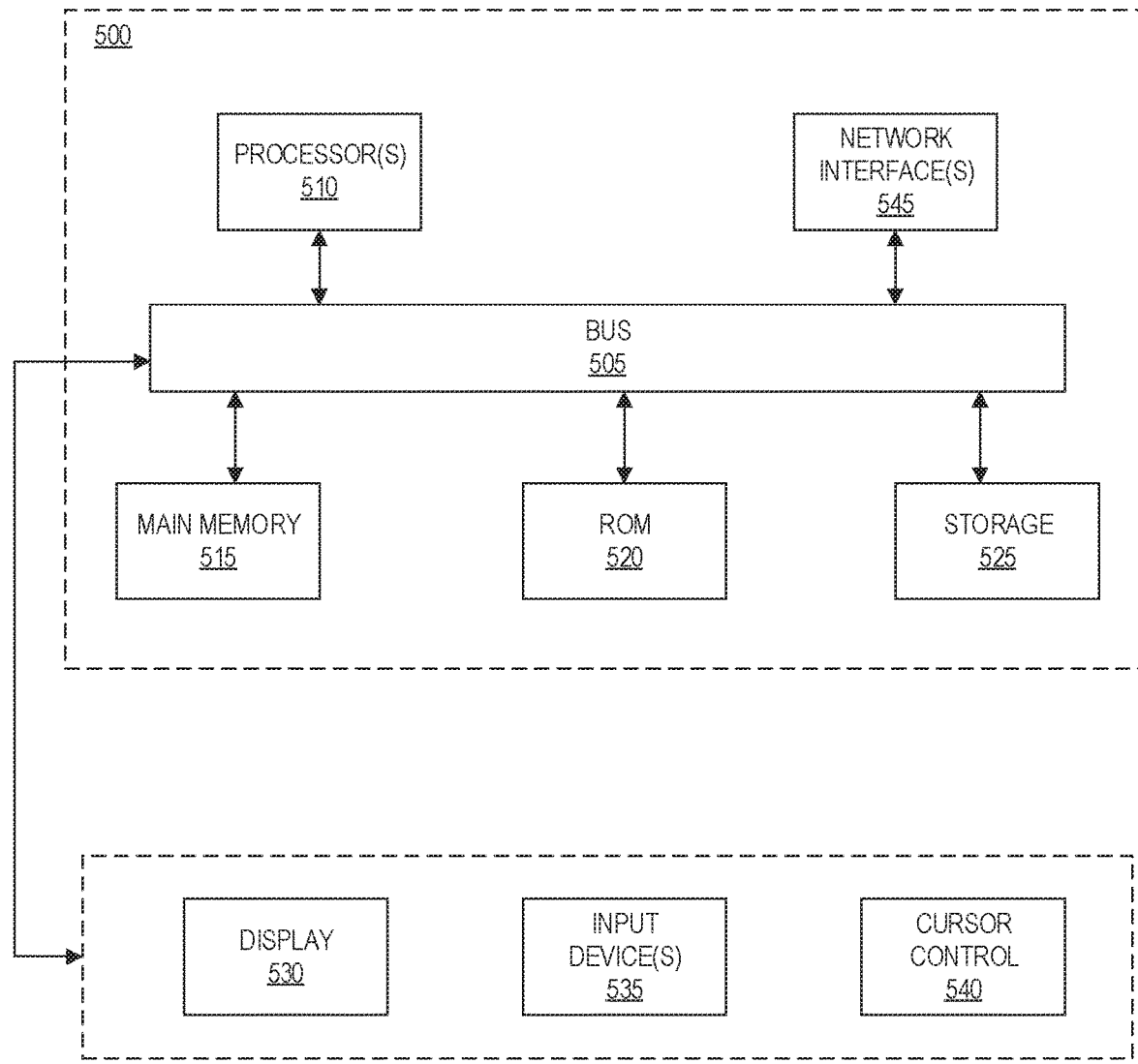
FIG. 5 is a block diagram of an example computer system in which various embodiments described herein may be implemented.

FIG. 5 depicts a block diagram of an example computer system 500 in which various of the embodiments described herein may be implemented. The computer system 500 includes a bus 505 or other communication mechanism for communicating information, one or more hardware processors 510 coupled with bus 505 for processing information. Hardware processor(s) 510 may be, for example, one or more general purpose microprocessors.

The computer system 500 also includes a main memory 515, such as a random access memory (RAM), cache and/or other dynamic storage devices, coupled to bus 505 for storing information and instructions to be executed by processor 510. Main memory 515 also may be used for storing temporary variables or other intermediate information during execution of instructions to be executed by processor 510. Such instructions, when stored in storage media accessible to processor 510, render computer system 500 into a special-purpose machine that is customized to perform the operations specified in the instructions.

The computer system 500 further includes a read only memory (ROM) 520 or other static storage device coupled to bus 505 for storing static information and instructions for processor 510. A storage device 525, such as a magnetic disk, optical disk, or USB thumb drive (Flash drive), etc., may be provided and coupled to bus 505 for storing information and instructions.

The computer system 500 may further include a display 530 coupled to bus 505 for displaying a graphical output to a user. The computer system 500 may further include one or more input devices 535, such as a keyboard, camera, microphone, etc., coupled to bus 505 for providing an input from a user. The computer system 500 may further include a cursor control, such as a mouse, pointer, stylus, etc., coupled to bus 505 for providing an input from a user.

The computer system 500 may further includes one or more network interfaces 545, such as a network interface controller (NIC), network adapter, etc., coupled to bus 505 for connecting the computer system 500 to a network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 510 executing one or more sequences of one or more instructions contained in main memory 515. Such instructions may be read into main memory 515 from another storage medium, such as storage device 525. Execution of the sequences of instructions contained in main memory 515 causes processor(s) 510 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 525. Volatile media includes dynamic memory, such as main memory 515. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 505. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A network device, comprising:
   a transmitter antenna;
   a first receiver antenna a first distance from the transmitter antenna and a second receiver antenna a second distance from the transmitter antenna; and
   a processing resource and a non-transitory machine-readable medium comprising instructions executable by the processing resource to:
   transmit, by the transmitter antenna, a wireless signal having a transmit power;
   receive, by the first receiver antenna and the second receiver antenna, a reflected signal of the wireless signal, wherein the reflected signal is reflected off of an object;
   receive, by the first receiver antenna and the second receiver antenna, a static signal of the wireless signal, wherein the static signal is not reflected off of the object;
   process the received static and reflected signals and determine a location of the object, based on the processed received static and reflected signals, the first distance, the second distance, and the transmit power.

2. The network device of claim 1, wherein the instructions comprise instructions executable by the processing resource to:
   generate a model to approximate a static signal and a reflected signal to be received by the first and second receiver antennas, based on the first distance, the second distance, and the transmit power; and wherein processing the received static and reflected signals is based on the approximated static and reflected signals of the model.

3. The network device of claim 2, wherein generating the model comprises instructions executable to:
determine approximated magnitudes of the static signal to be received by the first and second receiver antennas, based on the first distance, the second distance, and the transmit power; and
determine, for each of a predetermined set of distances, an approximated magnitude of a reflected signal to be received by each of the first and second receiver antennas, based on the transmit power.

4. The network device of claim 3, wherein generating the model comprises instructions executable to:
determine, for each of the approximated magnitudes of the static and reflected signals to be received by each of the first and second receiver antennas, an approximated conjugate product of channel state information (CSI) of the static and reflected signals to be received by the first receiver antenna and by the second receiver antenna.

5. The network device of claim 1, wherein processing the received static and reflected signals comprises instructions executable to:
determine, for each of a plurality of intervals within a predetermined time period, a maximum likelihood (ML) estimation of a magnitude of the received reflected signal.

6. The network device of claim 5, wherein processing the received static and reflected signals comprises instructions executable to:
determine, for the plurality of intervals, a best ML estimation of a distance of the object from the network device; and
determine, for the plurality of the intervals, a best ML estimation of an angle of the object from the network device.

7. The network device of claim 1, wherein determining the location of the object is based on a best maximum likelihood (ML) estimation of a distance of the object from the network device and a best ML estimation of an angle of the object from the network device.

8. The network device of claim 1, wherein the instructions comprise instructions executable by the processing resource to:
determine locations of multiple objects based on the processed static and reflected signals.

9. The network device of claim 1, wherein the first distance is equal to the second distance.

10. The network device of claim 1, further comprising:
a third receiver antenna and a fourth receiver antenna; and
wherein generating the model comprises instructions executable to:
approximate a static signal and a reflected signal to be received by the first, second, third, and fourth receiver antennas, based on distances between the first, second, third, and fourth receiver antennas and the transmit signal power.

11. A method for determining a location of an object, comprising:
determining a first distance between a transmitter antenna of a network device and a first receiver antenna of the network device and a second distance between the transmitter antenna and a second receiver antenna of the network device;
transmitting, by the transmitter antenna, a wireless signal having the transmit power;
receiving, by the first receiver antenna and the second receiver antenna, a reflected signal of the wireless signal, wherein the reflected signal is reflected off of an object;
receiving, by the first receiver antenna and the second receiver antenna, a static signal of the wireless signal, wherein the static signal is not reflected off of the object; and
processing the received static and reflected signals and determining a location of the object, based on the processed received static and reflected signals, the first distance, the second distance, and the transmit power of the network device.

12. The method of claim 11, comprising:
generating a model to approximate a static signal and a reflected signal to be received by the first and second receiver antennas, based on the first distance, the second distance, and the transmit power; and
wherein processing the received static and reflected signals is based on the approximated static and reflected signals of the model.

13. The method of claim 12, wherein generating the model comprises:
determining approximated magnitudes of the static signal to be received by the first and second receiver antennas, based on the first distance, the second distance, and the transmit power;
determining, for each of a predetermined set of distances, an approximated magnitude of a reflected signal to be received by each of the first and second receiver antennas, based on the transmit power; and
determining, for each of the approximated magnitudes of the static and reflected signals to be received by each of the first and second receiver antennas, an approximated conjugate product of channel state information (CSI) of the static and reflected signals to be received by the first receiver antenna and by the second receiver antenna.

14. The method of claim 11, wherein processing the received static and reflected signals comprises:
determining, for each of a plurality of intervals within a predetermined time period, a maximum likelihood (ML) estimation of a magnitude of the received reflected signal;
determining, for the plurality of intervals, a best ML estimation of a distance of the object from the network device; and
determining, for the plurality of the intervals, a best ML estimation of an angle of the object from the network device.

15. The method of claim 11, wherein determining the location of the object is based on a best maximum likelihood (ML) estimation of a distance of the object from the network device and a best ML estimation of an angle of the object from the network device.

* * * * *